United States Patent
Choi

(10) Patent No.: US 6,693,677 B1
(45) Date of Patent: Feb. 17, 2004

(54) APPARATUS FOR COMMONLY USING ANTENNA FOR CALL SIGNAL AND TELEVISION BROADCASTING SIGNAL IN RADIO COMMUNICATION TERMINAL

(75) Inventor: Teak-Kyun Choi, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 426 days.

(21) Appl. No.: 09/721,018

(22) Filed: Nov. 22, 2000

(30) Foreign Application Priority Data

Nov. 22, 1999 (KR) ........................................ 1999-51827

(51) Int. Cl.⁷ ................................................ H04N 5/44
(52) U.S. Cl. ........................ 348/553; 348/552; 348/725
(58) Field of Search ................................ 348/553, 552, 348/729, 725; 343/720; 455/466, 66, 150.1, 275, 277.1, 280, 289

(56) References Cited

U.S. PATENT DOCUMENTS

| | | | | |
|---|---|---|---|---|
| 5,056,153 A | * | 10/1991 | Taniguchi et al. | 455/89 |
| 5,138,312 A | * | 8/1992 | Tsukamoto et al. | 340/825.44 |
| 5,584,070 A | * | 12/1996 | Harris et al. | 455/346 |
| 5,805,113 A | * | 9/1998 | Ogino et al. | 343/713 |
| 6,313,887 B1 | * | 11/2001 | Gudorf | 348/734 |

FOREIGN PATENT DOCUMENTS

| | | | | |
|---|---|---|---|---|
| JP | 4-238475 A | | 8/1992 | |
| JP | 11068604 A | * | 3/1999 | H01Q/1/32 |
| JP | 2001223519 A | * | 8/2001 | H01Q/5/01 |

OTHER PUBLICATIONS

Chinese First Office Action dated Aug. 8, 2003, issued in a counterpart application, namely, Appln. No. 00131719.9.

* cited by examiner

*Primary Examiner*—Victor R. Kostak
(74) *Attorney, Agent, or Firm*—Dilworth & Barrese, LLP

(57) ABSTRACT

Disclosed is an apparatus for commonly using an antenna for a call signal and a television (TV) broadcasting signal in a radio communication terminal including a phone duplexer, a TV tuner, a single antenna for commonly receiving the call signal and the TV broadcasting signal, a phone LC resonance section, provided on a front end of the phone duplexer, for forming an LC resonance circuit for a call signal frequency band, a TV LC resonance section, provided on a front end of the TV tuner, for forming an LC resonance circuit for a TV broadcasting signal frequency band, and a switching section for connecting the antenna to the phone LC resonance section or to the TV LC resonance section in accordance with a switching control signal provided according to a TV or call operating mode.

7 Claims, 3 Drawing Sheets

APPARATUS FOR COMMONLY USING ANTENNA FOR CALL SIGNAL AND TELEVISION BROADCASTING SIGNAL IN RADIO COMMUNICATION TERMINAL

BACKGROUND OF THE INVENTION

1. Field of the Invention

The present invention relates generally to a radio communication terminal, and more particularly to an antenna of a radio communication terminal that can receive and transmit a call communication signal but also receive a television (TV) broadcasting signal.

2. Description of the Related Art

Generally, with the rapid development of networks for providing information, the development of a composite radio communication terminal having diverse functions in addition to the audio transferring function has been required. Accordingly, a composite radio communication terminal containing a portable terminal for viewing TV in addition to the audio transmitting and receiving function (hereinafter referred to as a TV phone) has been developed. An example of such a TV phone is contained in a Korean Patent Application bearing application number 1999-31824, entitled "Information Display Method in a TV Phone", and filed by the applicant herein.

Since the TV phone needs to receive a TV broadcasting signal as well as being capable of the transmission and reception of an audio signal, a problem is created in designing an antenna and associated circuitry for receiving both types of signals.

FIG. 1 is a block diagram illustrating an antenna structure of a conventional TV phone for receiving an audio call signal and a TV broadcasting signal. Referring to FIG. 1, the TV phone 10 includes an antenna ANT_T for receiving the TV broadcasting signal, and an antenna ANT_P for transmitting and receiving a code division multiple access (CDMA) audio signal used in a typical digital portable phone. The antenna ANT_T for receiving the TV broadcasting signal is connected to a TV tuner 12 in the TV phone 10, and the antenna ANT_P for transmitting and receiving the audio signal is connected to a phone duplexer 14 in the TV phone 10. Though having the respective antennas for the audio signal and the TV broadcast signal achieves good receiving sensitivity for the call signal and the TV broadcasting signal, it creates a problem in designing a low-priced and small-sized radio terminal.

FIG. 2 is a view illustrating another antenna structure of a conventional TV phone for receiving an audio call signal and a TV broadcasting signal. According to the antenna structure of FIG. 2, a general antenna ANT is used for transmitting and receiving of the CDMA audio signal and receiving the TV broadcast signal. Specifically, the antenna ANT of the TV phone 10 is connected to the phone duplexer 14, and to the TV tuner 12 through band pass filter 16. The band pass filter 16 filters and outputs to the TV tuner 12 the TV broadcasting frequency received through the antenna ANT. Though using a conventional CDMA phone antenna for receiving the TV broadcasting signal may reduce the problem in designing a low-priced radio terminal, the receiving sensitivity of the TV broadcasting signal is compromised since the construction of the antenna is designed for receiving the CDMA audio signal.

SUMMARY OF THE INVENTION

Accordingly, the present invention-solves the problems inherent in the related art, and an object of the present invention is to provide an apparatus for commonly using a single antenna for an audio call signal and a TV broadcasting signal in a radio communication terminal TV phone which improves the receiving sensitivity of both the TV broadcasting signal and the call signal at a low cost.

It is another object of the present invention to provide an apparatus for commonly using an antenna for a call signal and a TV broadcasting signal in a radio communication terminal which improves the receiving sensitivity of both the TV broadcasting signal and the call signal with its construction simplified and small-sized.

In order to achieve the above objects, according to the present invention, there is provided an apparatus for commonly using an antenna for a call signal and a TV broadcasting signal in a radio communication terminal having a phone duplexer and a TV tuner, the apparatus comprising a single antenna for commonly receiving the call signal and the TV broadcasting signal, a phone LC resonance section, provided on a front end of the phone duplexer, for forming an LC resonance circuit for a call signal frequency band, a TV LC resonance section, provided on a front end of the TV tuner, for forming an LC resonance circuit for a TV broadcasting signal frequency band, and a switching section for connecting the antenna to the phone LC resonance section or to the TV LC resonance section in accordance with a switching control signal provided. according to a TV or call operating mode.

BRIEF DESCRIPTION OF THE DRAWINGS

The above objects and advantages of the present invention will become more apparent by describing in detail the preferred embodiment thereof with reference to the attached drawings in which.

DETAILED DESCRIPTION OF THE PREFERRED EMBODIMENT

The preferred embodiment of the present invention will now be explained in detail with reference to the accompanying drawings. In the following description of the present invention, many specified items such as detailed constituent elements are indicated, but they are provided only for the whole understanding of the present invention and thus it will be apparent by those skilled in the art that other modifications or changes thereof may be made without departing from the scope and spirit of the present invention.

Figure 1:
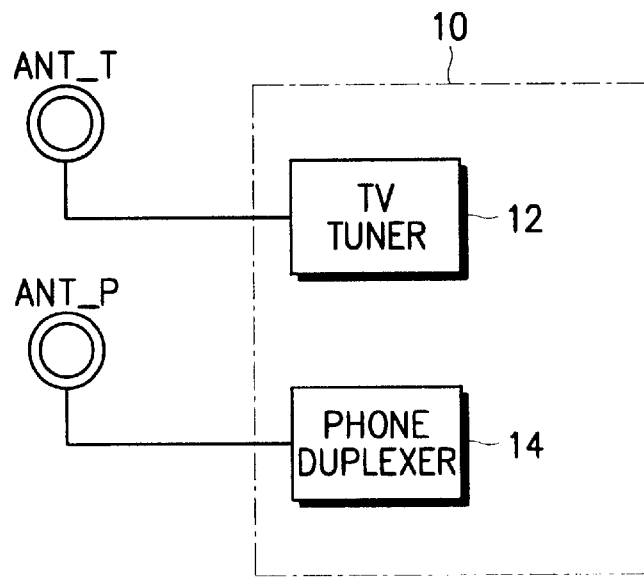
FIG. 1 is a block diagram illustrating a conventional antenna structure of a radio communication terminal for receiving and transmitting a call signal and receiving a TV broadcasting signal.
Figure 2:
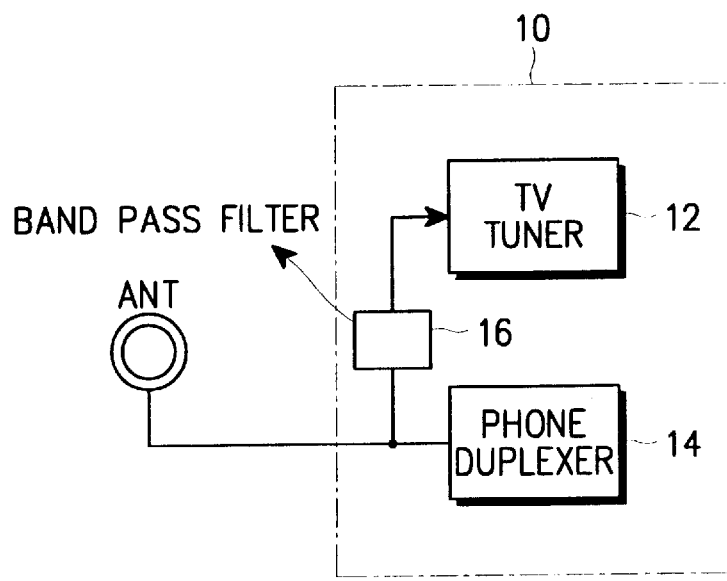
FIG. 2 is a block diagram illustrating another conventional antenna structure of a radio communication terminal for receiving and transmitting a call signal and receiving a TV broadcasting signal.
Figure 3:
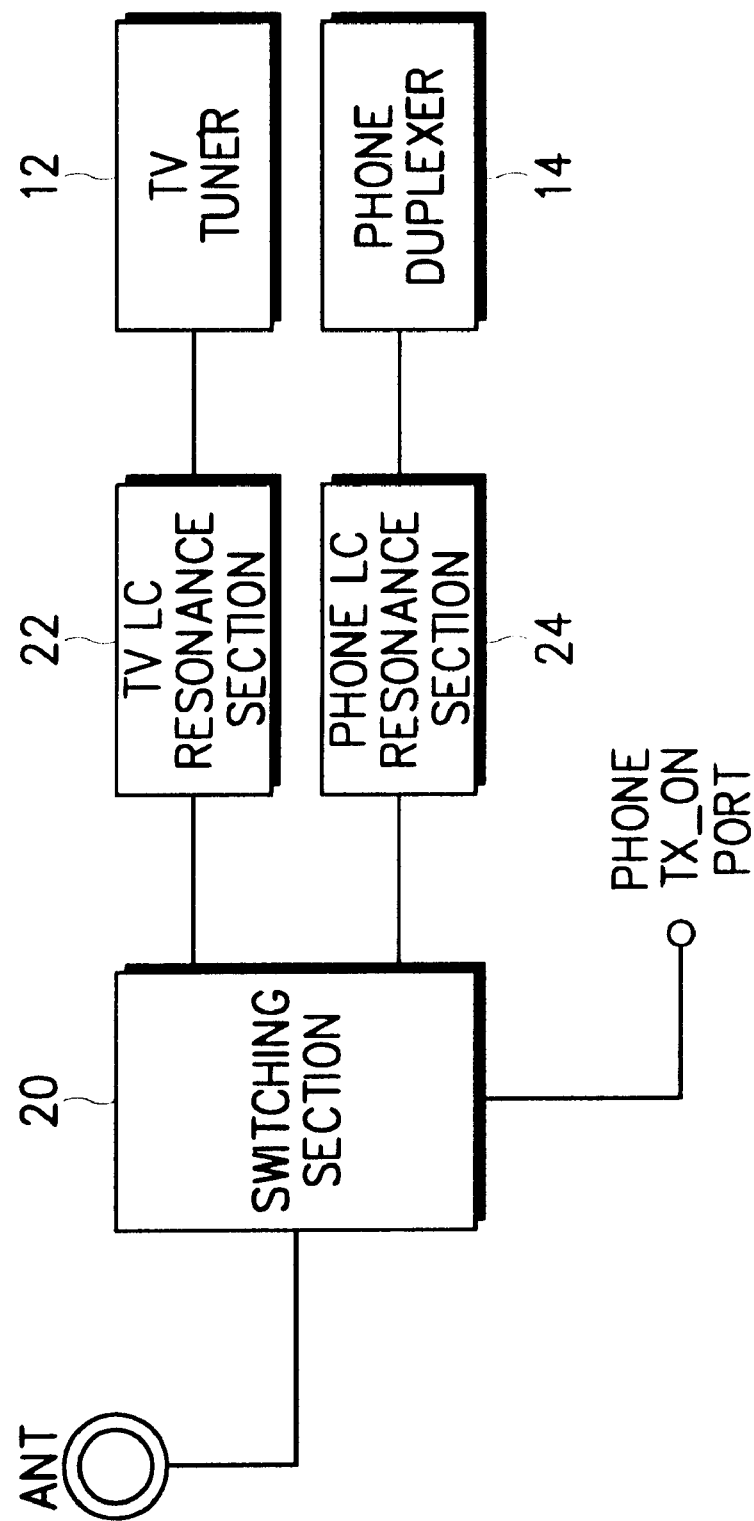
FIG. 3 is a block diagram illustrating an apparatus for commonly using an antenna for the call signal and the TV broadcasting signal in a radio communication terminal according to an embodiment of the present invention.

FIG. 3 is a block diagram illustrating an apparatus for commonly using an antenna for the call signal and the TV broadcasting signal in a radio communication terminal according to an embodiment of the present invention. Referring to FIG. 3, the apparatus for commonly using an antenna for a call signal and a TV broadcasting signal in a radio communication terminal includes an antenna ANT for commonly receiving and transmitting the call signal and receiving the TV broadcasting signal, a phone LC resonance section 24 provided on a front end of a phone duplexer 14 for forming an LC resonance circuit for a CDMA call signal frequency band, a TV LC resonance section 22 provided on a front end of a TV tuner 12 for forming an LC resonance circuit for a TV broadcasting signal frequency band, and a switching section 20 for connecting the antenna ANT to the phone LC resonance section 24 or to the TV LC resonance section 22 in accordance with a switching control signal provided according to a TV or call operating mode.

In the TV phone, a TV circuit module for a TV mode for performing the viewing the TV broadcasting signal, and a call circuit module for a call mode and. a reception standby mode for performing a call communication are provided. A mobile station processor (not shown) outputs a "high" or "low" signal PHONE TX__ON PORT in accordance with the operation modes of the respective modules. This signal is provided as the switching control signal of the switching section 20. Hereinafter, the circuit construction of the apparatus according to the present invention as shown in FIG. 3 will be explained with reference to FIG. 4.

Figure 4:
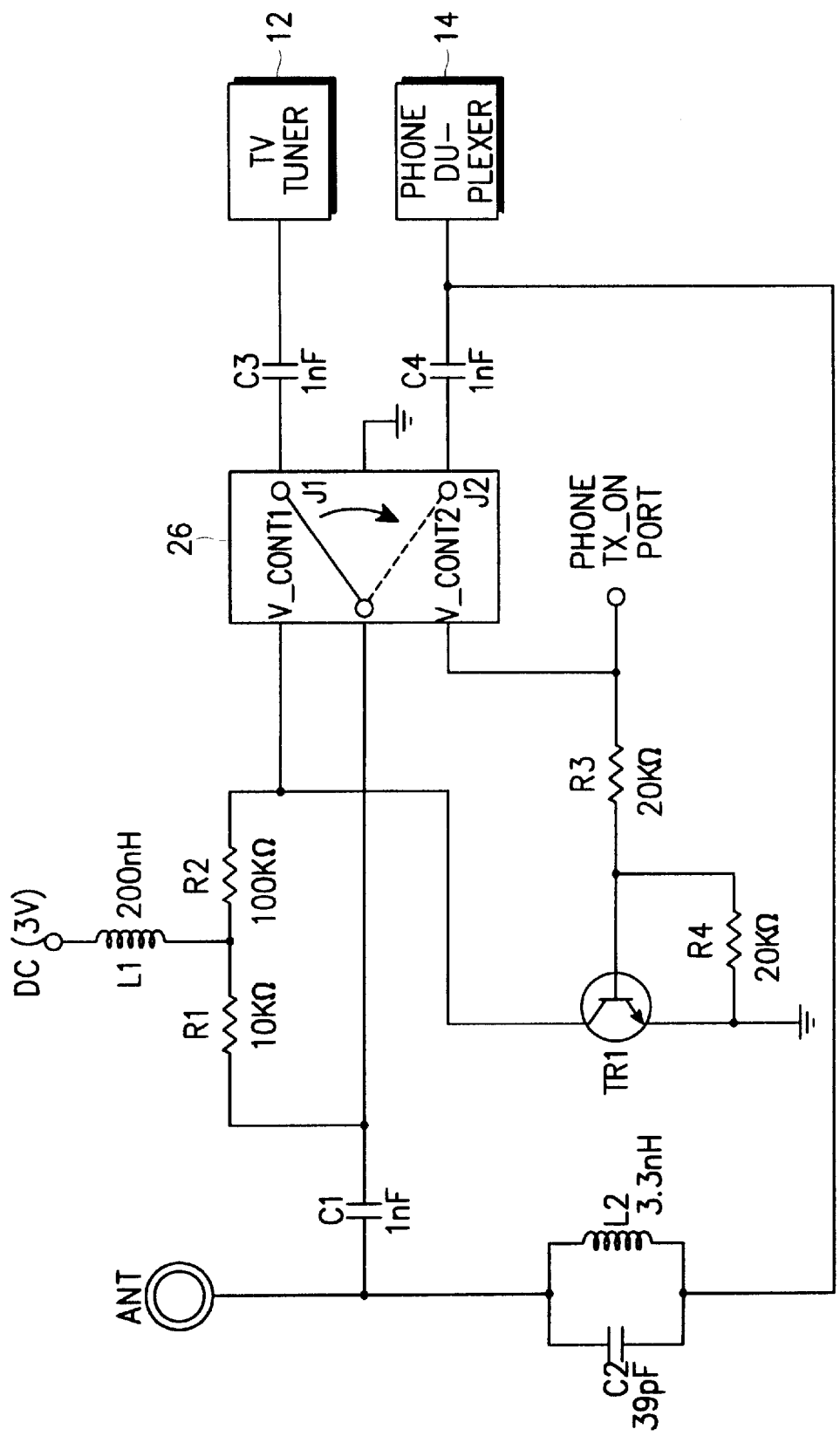
FIG. 4 is a schematic diagram illustrating an apparatus for commonly using an antenna for the call signal and the TV broadcasting signal in a radio communication terminal according to an embodiment of the present invention.

FIG. 4 is a schematic diagram illustrating an apparatus for commonly using an antenna for the call signal and the TV broadcasting signal in a radio communication terminal according to an embodiment of the present invention. Referring to FIG. 4, the apparatus according to the present invention includes an antenna ANT for commonly receiving and transmitting the CDMA call signal and receiving the TV broadcasting signal, an LC parallel circuit composed of a second capacitor C2 and a second inductor L2 and connected to the antenna ANT for forming an LC resonance circuit for the CDMA call signal frequency band, and a duplexer 14 connected to the rear end of the LC parallel circuit. The apparatus according to the present invention also includes an LC series circuit that is connected to a connection point of the LC parallel circuit and the antenna ANT, and which is composed of a first capacitor Cl and a first inductor L1 connected together through a first resistor R1. The LC series circuit receives a DC power supply of 3V, and the first capacitor C1 of the LC series circuit is connected to the connected point of the LC parallel circuit and the antenna ANT.

The apparatus according to the present invention also includes a switching element 26 for connecting the connection point of the first capacitor C1 of the LC series circuit and the first resistor R1 to either of two output terminals J1 and J2 in accordance with the control signal provided thereto. The first output terminal J1 of the switching element 26 is connected to the TV tuner 12 through a third capacitor C3, and the second output terminal J2 is connected to the phone duplexer 14 through a fourth capacitor C4.

The apparatus according to the present invention also includes an NPN-type switching transistor TR1 whose collector is connected to the connected point of the first inductor L1 of the LC series circuit and the first resistor R1 through a second resistor R2, whose emitter is connected to a ground terminal, and whose base is connected to a PHONE TX__ON PORT through a third resistor R3 to receive the switching control signal as shown in FIG. 4. The base and the emitter of the transistor TR1 are connected through a fourth resistor R4.

The switching element 26 may be implemented using an AS173-73 (DC~2 GHz) switching element. The AS173-73 switching element 26 has two control signal input terminals V_CONT1 and V_CONT2, and performs a switching operation in accordance with levels of the control signals input into its control signal input terminals. The first input terminal V_CONT1 of the switching element 26 is connected to the collector of the transistor TR1, and the second terminal V_CONT2 thereof is connected to the PHONE TX_ON PORT.

As shown in FIG. 4, the LC parallel circuit connected between the antenna ANT and the phone duplexer 14 contains a second capacitor C2 of 3.9 pF and the second inductor L2 of 3.3 nH. The first capacitor C1 of the LC series circuit has a value of 1 nF and the first inductor L1 has a value of 200 nH. The first resistor R1 is 10 KΩ, and resistors R3 and R4 of the switching transistor TR1 are each 20 KΩ. Also, capacitors C3 and C4, respectively connected in series to the first and the fourth output terminals J1 and J2 of the switching element 26, are each 1 nF.

If the PHONE TX_ON PORT is in a high level, the second control signal input terminal V_CONT2 of the switching element 26 becomes high, and the first control signal input terminal V_CONT1 thereof becomes low as the transistor TR1 is turned on and thus the DC power supply is bypassed to the ground terminal. In this case, the switching element 26 performs a switching operation so that its input terminal is switched over to the second output terminal J2, and the antenna ANT is connected to the phone duplexer 14 through the first capacitor C1 and the fourth capacitor C4. At this time, the antenna ANT and the phone duplexer 14 are also connected to the LC parallel circuit, and the LC resonance generated by the whole circuit construction properly matches the frequency bandwidth of the call audio signal. This LC resonance circuit comprises the phone LC resonance section 24 as shown in FIG. 3.

Meanwhile, if the PHONE TX_ON PORT is in a low level, the second control signal input terminal V_CONT2 of the switching element 26 becomes low, and the first control signal input terminal V_CONT1 thereof becomes high as the transistor TR1 is turned off and thus the DC power supply is applied to the first input terminal V_CONT1. In this case, the switching element 26 performs a switching operation so that its input terminal is switched over to the first output terminal J1, and the antenna ANT is connected to the TV tuner 12 through the first capacitor C1 and the third capacitor C3. At this time, the LC resonance generated by the whole circuit construction properly matches the frequency bandwidth of the TV broadcasting signal. This LC resonance circuit comprises the TV LC resonance section 22 as shown in FIG. 3, and the switching element 26 and the switching transistor TR1 of FIG. 4 constitute the switching section 20 as shown in FIG. 3.

The operation of the switching element 26 according to the level of the PHONE TX_ON PORT as described above is shown in Table 1 as below.

TABLE 1

| V-CONT1 | V-CONT2 | ANT-J1 | ANT-J2 |
|---------|---------|--------|--------|
| HIGH    | LOW     | SHORT  | OPEN   |
| LOW     | HIGH    | OPEN   | SHORT  |

Hereinafter, the operation of the apparatus for commonly using an antenna for the call signal and the TV broadcasting signal according to the embodiment of the present invention will be explained in detail in accordance with the respective operation modes.

First, in the call communication mode, the audio signal transmitting and receiving section of the TV phone is in an "on" state, and thus the PHONE TX_ON PORT becomes high. The switching transistor TR1 is turned on. As the switching transistor TR1 is turned on, the first and second control signal input terminals V_CONT1 and V_CONT2 of the switching element 26 become low and high, respectively. Thus, a path is provided between the antenna and the second output terminal J2 of the switching element 26, and the first output terminal J1 of the switching element 26 is isolated. At this time, the phone duplexer 14 is almost open with respect to the TV side, and the transmitted audio signal cannot be transferred to the TV tuner 12. Thus, the damage of the TV tuner 14 which may be caused by the transmission power, i.e., the open loop power produced according to a position registration, destination call, etc., of the phone can be prevented during viewing TV. Since the isolation degree of the TV tuner 12 side is about 22 dB, the reception of the TV broadcasting signal is possible even if the transmission power of the phone is produced in a strong TV electric field state. Since the insertion loss of the switching element 26 is about 0.3 dB, the transmission and reception operation of the phone can be smoothly performed almost without loss and irrespective of the TV module.

In the reception standby mode, the PHONE TX_ON PORT is in a "low" state. At this time, the switching transistor TR1 is turned off, and a path is provided between the antenna ANT and the first output terminal J1 of the switching element 26. At this time, the received signal of the phone proceeds to the phone duplexer 14 through the series LC resonance circuit in a band of about 470 MHz, and the phone is in the reception standby state.

In the TV mode, the same operation as in the reception standby mode is performed. In this mode, the TV broadcasting signal proceeds to the TV tuner 12, and the reception of the TV broadcasting signal is possible. The LC series resonance circuit for receiving the phone signal performs a band-rejection-filtering of the TV broadcasting signal (about 470 MHz) according to the characteristic of the phone duplexer 14, and thus the outflow of the TV broadcasting signal to the phone duplexer 12 is prevented. Similarly, since the insertion loss of the switching element is about 0.3 dB during the reception of the TV broadcasting signal, the power can be transferred from the antenna ANT to the TV tuner 12.

As described above, it will be apparent that the apparatus for commonly using an antenna for the TV broadcasting signal and the call signal according to the present invention provides the advantages that it can improve the receiving sensitivity of the TV broadcasting signal and the call signal using a single antenna at a low cost and with its construction simplified and small-sized.

While this invention has been described in connection with what is presently considered to be the most practical and preferred embodiment, it is to be understood that other modifications thereof may be made without departing from the scope of the invention. Thus, the invention should not be limited to the disclosed embodiment, but should be defined by the scope of the appended claims and their equivalents.

What is claimed is:

1. An apparatus for commonly using an antenna for a call signal and a television (TV) broadcasting signal in a radio communication terminal having a phone duplexer and a TV tuner, the apparatus comprising:

a single antenna for commonly receiving the call signal and the TV broadcasting signal;

a phone LC resonance section, provided on a front end of the phone duplexer, for forming an LC resonance circuit for a call signal frequency band;

a TV LC resonance section, provided on a front end of the TV tuner, for forming an LC resonance circuit for a TV broadcasting signal frequency band; and a switching section for connecting the antenna to the phone LC resonance section or to the TV LC resonance section in accordance with a switching control signal provided when the terminal is in a TV or call operating mode, wherein the phone LC resonance section connects the single antenna to the phone duplexer in both the TV and call operating modes, regardless of connection status of the switching section.

2. A circuit for commonly using an antenna for a call signal and a television (TV) broadcasting signal in a radio communication terminal having an antenna, a phone duplexer, and a TV tuner, the apparatus comprising:

an LC parallel circuit connected between the antenna and the phone duplexer;

an LC series circuit, connected to a connected point of the LC parallel circuit and the antenna, and connected to a DC power supply terminal; and a switching section for connecting the LC series circuit to the phone duplexer or to the TV tuner in accordance with a switching control signal provided when the terminal is in a TV or call operating mode, wherein the LC parallel circuit connects the phone duplexer and the antenna regardless of the switching control signal.

3. A television (TV) phone having an antenna, a phone duplexer, a TV tuner, and a DC power source, comprising:

an LC parallel circuit;

an LC series circuit;

a multiplexer;

means for connecting said LC parallel circuit between said antenna and said phone duplexer;

means for connecting said LC series circuit between said antenna and said DC power source; and means for connecting an input of said multiplexer to a connection point between a capacitor and an inductor of said LC series circuit, a first output to said TV tuner, and a second output to said phone duplexer, wherein the LC parallel circuit bypasses the multiplexer.

4. The apparatus of claim 3, further comprising a switch connected between said connection point of said input of said multiplexer and ground.

5. The apparatus of claim 4, wherein the switch is a transistor.

6. A method of receiving and transmitting a call signal and receiving a television (TV) broadcast signal in a TV phone having an antenna, a phone duplexer, and a TV tuner, comprising the steps of:

switching said TV phone into one of a TV mode, a call mode and a standby mode;

receiving a signal;

routing said signal to one of said phone duplexer and said TV tuner; and preventing damage to the TV tuner from transmission power of the phone duplexer by providing an LC parallel circuit connecting the phone duplexer and the antenna that is not switched.

7. The method of claim 6, wherein said signal is routed through a multiplexer controlled by said switching step.

* * * * *